Oct. 16, 1962

E. S. SHOPE 3,058,471

CORNEA TOME

Filed Feb. 25, 1957

2 Sheets-Sheet 1

INVENTOR
EARL S. SHOPE

BY Paul M. Craig, Jr.

ATTORNEY

Oct. 16, 1962 E. S. SHOPE 3,058,471

CORNEA TOME

Filed Feb. 25, 1957 2 Sheets-Sheet 2

INVENTOR
EARL S. SHOPE

BY Paul M. Craig, Jr.

ATTORNEY

United States Patent Office 3,058,471

Patented Oct. 16, 1962

3,058,471

CORNEA TOME

Earl S. Shope, 10B Manor Circle, Apt. 7, Takoma Park 12, Md.

Filed Feb. 25, 1957, Ser. No. 642,056
10 Claims. (Cl. 128—305)

The present invention relates to a cornea tome, and more particularly to a cornea tome which facilitates cornea grafts by enabling grafts thereof under such conditions as will retain the shape of the cornea.

Cornea grafts, either partial or total, have become increasingly important as the procedures of the so-called "eye-bank" have been more and more perfected.

Within recent years, it has been found that such eye banks are possible by storing the eye ball in a culture media, usually of balanced salt solution with human serum.

If the eye is removed from the dead person within a certain time, usually seventy-two hours after death, the complete eyeball may be stored for a period of up to approximately seventy-two hours in such culture media.

The cornea may then be removed from the eyeball thus stored within the period indicated in any suitable manner as, for example, by the use of a trefine. Under this procedure, the eyeball is usually held in any suitable manner by a gauze or the like to prevent slippage.

While total grafts are possible, usually the cornea grafts are only partial or lamellar so that it becomes necessary to cut out the desired portion of the cornea. This is usually accomplished by the use of a flat paraffin block on which the cornea is secured, for example, by means of pins piercing the outer edges thereof, for purposes of the graft.

Since the cornea has essentially no resiliency, the cutting thereof on an essentially flat block or planar surface destroys the normal curvature thereof as it exists in the eyeball of the human being. Moreover, the flattened area thus cut out by the use of a trefine or the like actually does not correspond to the curved surface ultimately needed in the patient's eye due to differences in curvature as ordinarily required. In other words, if the normal curvature of the eyeball is not preserved during the graft then it is almost impossible to perform grafts meeting the required specification. Consequently, difficulties have arisen with the shape and size of cornea grafts by the use of the prior methods described hereinabove.

The present invention has for its object to obviate all of the disadvantages mentioned hereinabove and to facilitate also cornea grafts.

Accordingly, a principal object of the present invention is to provide an arrangement whereby cornea grafts may be realized in a simple manner providing cornea grafts which correspond in size and shape to those actually required by the eye of the patient.

Another object of the present invention is to provide a cornea tome which is simple in construction, relatively inexpensive to manufacture and which is particularly suitable for the purposes intended.

A still further object of the present invention is to provide such a cornea tome which will enable cornea grafts, especially partial or lamellar ones, corresponding exactly to the curvature, shape and size of the cornea graft required in the patient's eye.

Still another object of the present invention resides in the provision of a cornea tome which makes it possible to accurately control the size, location and curvature of the graft itself.

These and other objects, features and advantages of the present invention will become more obvious from the following description when taken in connection with the accompanying drawing which shows, for purposes of illustration only, one preferred embodiment in accordance with the present invention, and wherein FIGURE 1 is a front view of the cornea tome in accordance with the present invention;

The cornea tome in accordance with the present invention consists of a main part or block and two slidable top parts or plates suitably guided on the main part. The main part or block of the cornea tome is provided with appropriate recesses or bores in which a spherically or approximately spherically shaped piston member is supported on a threaded spindle so as to enable raising and lowering of the piston member by rotation of a knurled knob connected to the spindle. The slidable top members or plates are provided with curved inner recesses of such configuration as to be complementary or essentially complementary to the external curved surface of the piston member so that upon movement of the slidable top members or plates toward the center, i.e., toward the piston member, the cornea is securely held in place so that the cutting thereof may take place. An adjustable tool holder on which the cutting device, such as a trefine, is adjustably mounted, is itself movably attached to the main block of the cornea tome in accordance with the present invention.

Figure 5:
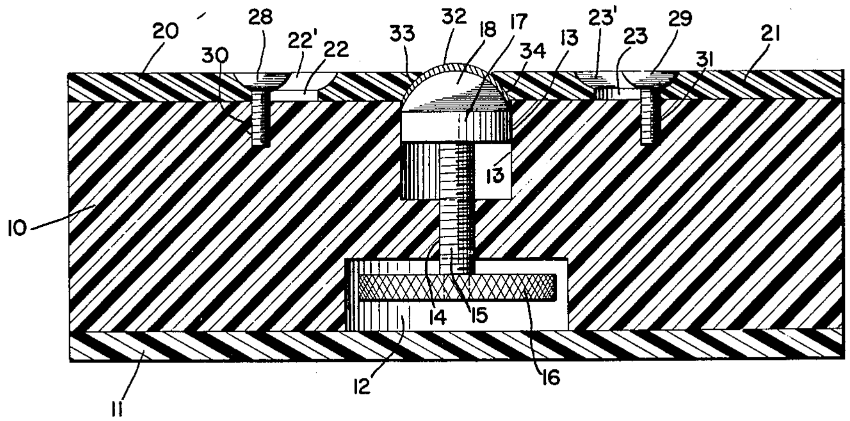
FIGURE 5 is a cross sectional view taken along line 5—5 of FIGURE 3.

Referring now more particularly to the drawing, wherein like reference numerals are used throughout the various views to designate like parts, reference numeral 10 designates the main part or block of the cornea tome which, for example, may be mounted in any suitable manner on a base plate 11. The main part or block 10 of the tome is provided with a lower bore or countersunk portion 12 and a relatively smaller upper bore or countersunk portion 13 (FIGURE 5). The bores 12 and 13 are connected with each other by a still smaller bore 14 which is threaded. A spindle 15 which is provided with external threads is in engagement with the threaded portion of bore 14 so that upon rotation of the knurled knob 16 rigidly attached to the spindle 15 at the lower end thereof, the spindle 15 is lowered or raised with respect to the main part or block 10 of the cornea tome depending on the direction of rotation. A piston member 17 is secured in any suitable manner to the top of the spindle 15, either rigidly, for example, by being formed integrally therewith, or detachably in any suitable manner. An approximately hemispherically shaped support member 18, the curvature of which corresponds to the desired curvature of the endothelial side of the cornea, and which may be formed integral with the piston member 17 or which may be detachably secured thereto is disposed on top of the piston member 17 so that upon rotating the knob 16 the unitary piston structure 17, 18 is raised or lowered depending on the direction of rotation.

Figure 1:
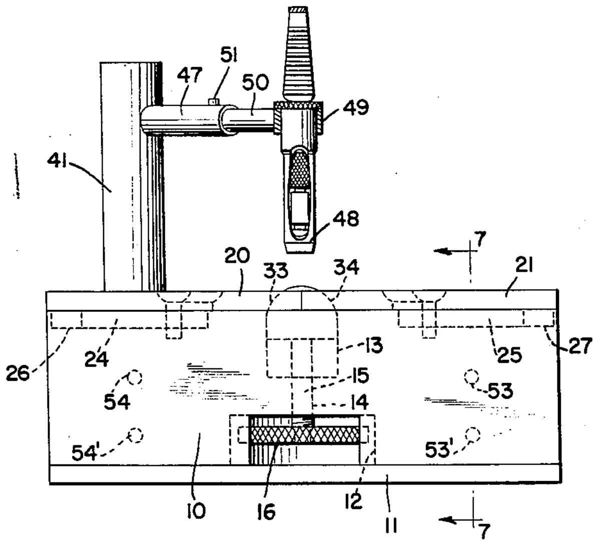
Figure 6:
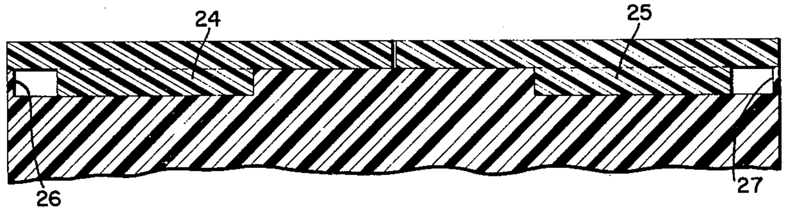
FIGURE 6 is a cross sectional view taken along line 6—6 of FIGURE 3.
Figure 7:
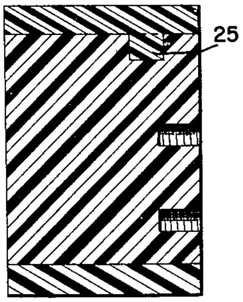
FIGURE 7 is a cross sectional view taken along line 7—7 of FIGURE 1.

The top members or plates 20 and 21 are slidably mounted on the top surface of the main part or block 10. Each slidable top member is provided with an elongated slot 22 and 23, respectively, (FIGURES 1, 3 and 5) and with a countersunk elongated slotted portion 22' and 23', respectively, for purposes to be more fully discussed hereinafter. Each slidable top portion or plate 20 and 21 is also provided with a downwardly extending key portion 24 and 25 which may be of any suitable configuration (FIGURES 6 and 7). The downwardly extending key portions engage keyways 26 and 27 of complementary shape and formed in the main portion or block 10 (FIGURE 6). As may be seen particularly clearly from FIGURE 6, the keyways 26 and 27 are longer than the key portions 24 and 25 thereby enabling a predetermined sliding movement of each top portion or plate in the longitudinal direction of the cornea tome. Moreover, the engagement of the key portions 24 and 25 in the keyways 26 and 27 limits the movement of the top portions or plates 20 and 21 to longitudinal movement in the directions of the keyways 26 and 27. In order to hold the slidable top portions 20 and 21 in any desired position along the path of sliding movement, and more particularly in the closed position thereof, screws 28 and 29 are provided which threadably engage threaded bores 30 and 31 (FIGURE 5) provided in the main part or block 10. The threaded shank portions of the screws 28 and 29 are accommodated in the elongated slots 22 and 23 while the head portions thereof are seated in the countersunk portions 22' and 23', respectively.

Reference numeral 32 designates a cornea, schematically illustrated in FIGURE 5, on which a cutting operation is to be performed. At first a supporting piston unit having a supporting head 18 of suitable configuration is chosen which is emplaced on the spindle 15. The cornea 32 is thereupon placed on the support head 18 which is raised to the desired height by rotating the knurled knob 16. During all this time the slidable plates 20 and 21 were in the outer positions thereof, i.e., in the positions thereof whereby the screws 28 and 29 are in abutment with the inward surfaces of the bores 22, 22', and 23, 23', respectively. Upon thus emplacing and adjusting the cornea 32 in its position in the cornea tome, the slidable top members or plates 20 and 21 are thereupon moved inwardly so that they assume the position thereof indicated in FIGURE 5. It should be noted that the slidable top portions or plates 20 and 21 are provided with internal curved surfaces or recesses 33 and 34 each extending over 180° as viewed in plan view in FIGURE 3. These interior surfaces are of such shape as to be complementary to the support head 18 with the cornea 32 inserted therebetween. Consequently, when the slidable top parts or plates 20 and 21 are brought to their inward positions, and the screws 28 and 29 are tightened, the cornea 32 is securely held in position so that the cut thereof may be performed.

In practice the measurements of an average human cornea of an adult were found to have the following vital measurements: the posterior surface of the cornea was found to have a curvature with a radius of 6.6 mm. while the anterior surface of the cornea was found to have a curvature with a radius of 7.8 mm. Thus it follows that the cornea is thicker in its periphery than in its center, and by actual measurements the cornea was found to be of approximately 0.8 mm. in the center and 1.2 mm. near the limbus.

Consequently, it is recommended that the top of support member 18 be shaped to fit the endothelial side of the cornea snugly while the inner surfaces of the sliding plates 20 and 21 be curved to fit the epithelial surface of the cornea in such a manner as to prevent wrinkling or buckling of the cornea. Allowances should preferably also be made in these dimensions to enable inclusion of a ring of sclera around the cornea to thereby minimize damage to the cornea itself while being held in the instrument and thus allowing removal of relatively large lamellar grafts.

It is also desirable that the thickness of plates 20 and 21 be kept as small as possible to provide as large as possible an opening. Moreover, the height of the support member should be greater than 2.68 mm., preferably 3.7 to 4.0 mm. to make allowance for the attached scleral ring. Additionally, an annular space of approximately 1.5 mm. should be provided between the support member 18 and plates 20 and 21 measured in the bottom plane of the plates 20 and 21 so as to provide for the scleral ring. With an average cornea of a human adult the diameter of the opening provided in the aforementioned plane by the particular configuration of inner surfaces of the plates 20 and 21 may amount to 11 to 12 mm.

The foregoing example is given for puropses of example only, it being understood that changes in the size of the cornea require corresponding changes in the dimensions of the aforementioned surfaces.

Any suitable device may be used for performing the cutting operation. In the present invention, a tool holder generally designated by reference numeral 40 is provided. The tool holder consists of an essentially cylindrical body 41 which slidably receives a piston member 42 of such configuration as to fit the internal diameter of the cylindrical body 41. A spring 43 of suitable strength is provided between the cylinder 41 and the piston 42 so as to tend to raise the cylindrical portion 41 relative to the fixed piston 42. The piston 42 is secured to a bracket 44 in any suitable manner. A knurled ring 46 is threadably adjustable on the threaded portion 45 formed integral with or secured to the lower part of piston 42. By adjusting the position of the ring 46 the extent of the downward movement of the cylindrical portion 41 abutting thereagainst may be controlled and thereby the depth of the cut may be accurately regulated. The cylindrical portion 41 is provided with an arm 47 extending outwardly therefrom at substantially right angle. The cutting device, properly speaking, such as a trefine, 48 is rotatably supported in the collar-like holder 49 which is provided with an arm portion 50 slidably accommodated within the arm 47. In order to definitely locate the trefine 48 with respect to the cylindrical portion 41 a set screw 51 is provided so as to retain the arm portion 50 in a fixed position within the arm 47. The set screw 51 engages in a keyway 50' provided in arm portion 50 to prevent also rotation of arm 50.

As may be readily visualized, the depth of the cut is adjusted by rotating the knob 46 while the position of the cut on the cornea 32 is accurately adjusted by positioning the cutting device 48 over the cornea, i.e., by rotating the cylindrical portion 41 and by adjusting the arm 50 within arm 47 to the accurate desired position.

The bracket member 44 is secured in any suitable manner, for example, by screws 52 and 52' in the main part or block 10 of the cornea tome provided therefor with threaded apertures 53 and 53' for right hand operation and threaded apertures 54 and 54' for left hand operation. The cutting device may thereby be suitably positioned and fastened on the main part or block 10 to suit the choice of the operator.

Figure 2:
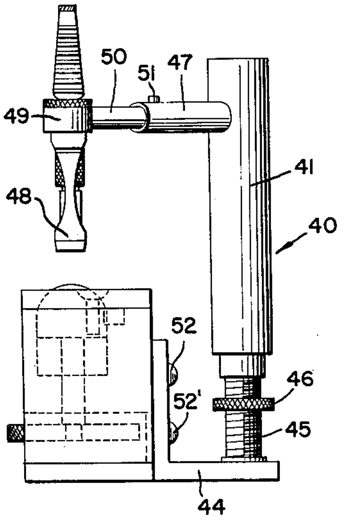
FIGURE 2 is a right side view of the cornea tome illustrated in FIGURE 1.
Figure 3:
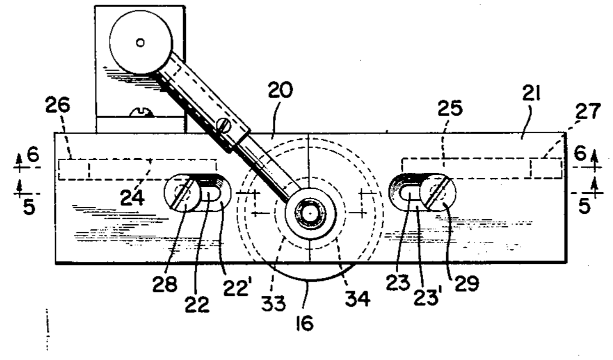
FIGURE 3 is a top plan view of the cornea tome illustrated in FIGURE 1.
Figure 4:
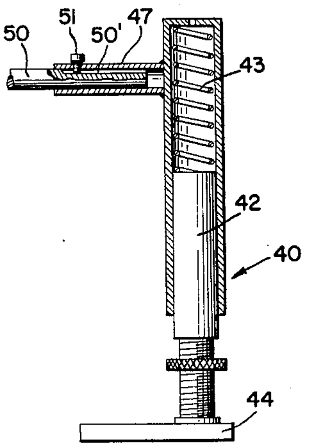
FIGURE 4 is a detailed cross sectional view of the adjusting mechanism in accordance with the present invention for the cutting device shown on an enlarged scale.

It should also be noted that the diameter of the bore 12 and of the knurled knob 16 as well as the location of the bores 12, 13 and 14 all of which are concentric to each other is so chosen that the knob 16 projects beyond the contours of the tome at one side thereof, as shown particularly in FIGURES 2 and 3 so as to facilitate actuation thereof.

The various parts of the cornea tome in accordance with the present invention may be made of any suitable material, such as stainless steel which may be accurately machined and readily sterilized, or suitable plastic which lends itself to cheap manufacture by injection molding or the like.

Moreover, it is also understood that the cornea tome in accordance with the present invention may also be successfully employed without the use of the tool holder assembly, it being possible to make the necessary cuts free-hand so long as the cornea is securely retained in the device in accordance wtih the present invention which assures the retention of the shape of the relatively inelastic cornea during the cutting operation.

While I have shown and described one preferred embodiment in accordance with the present invention, it is understood that the same is not limited thereto but is susceptible of many changes and modifications within the scope of the present invention, and I intend to cover all such changes and modifications as defined in the appended claims.

I claim:

1. The method of cutting cornea grafts comprising the steps of placing the cornea with its posterior side in contact with an approximately hemispherically-shaped support member, the curvature of which corresponds to that of said posterior side, thereupon applying clamping pressure throughout a closed peripheral zone of its anterior side to clamp the cornea in position on said support member to thereby assure retention of the curved shape of the cornea, and thereafter performing the cutting operation.

2. A cornea tome for securely holding in place the cornea while performing cuts thereon for purposes of cornea grafts, either total or partial or lamellar, comprising a base, closure means including a plurality of horizontally slidable closure plates and a support member movably supported in said base, means for adjusting said support member in a vertical direction, said support member and said closure plates being provided with complementary curved surfaces defining therebetween a space of such size and configuration as to accommodate and retain in said space a cornea in its normal shape upon closure of said closure means, and means for retaining each of said closure plates in the closed position thereof.

3. A cornea tome for securely holding in place the cornea while performing cuts thereon for purposes of cornea grafts, either total or partial or lamellar, comprising a main block provided with a vertical bore, a support member in said bore, a pair of closure plates mounted for slidable horizontal movement on said main block toward and from said support member, said closure plates being provided with complementary curved surfaces, said plates being movable to a position adjacent said support member in which said complementary surfaces define a space of such size and configuration as to accommodate and retain in said space a cornea supported on said support member.

4. A cornea tome according to claim 3, wherein means are provided in said main block for guiding said closure plates in said slidable movement thereof.

5. A cornea tome according to claim 3, wherein means are provided in said main block for causing vertical adjustment of said support member.

6. A cornea tome according to claim 3 wherein said support member and said closure plates are made of plastic material.

7. A cornea tome according to claim 3, wherein said support member and said closure plates are made of stainless steel.

8. A clamp for maintaining eye cornea in condition suitable for keratoplasty, comprising, in combination, a substantially spherically curved cornea-mounting element for receiving cornea free from surface irregularties and distortions, means applying pressure on a cornea mounted on said element and on said element comprising means having an opening therethrough adapted to receive said cornea-mounting element, said last-named means comprising oppositely disposed surfaces adapted to contact said cornea and to exert pressure thereon and on said cornea-mounting element for maintaining the cornea smoothly distributed over the said mounting element, said surfaces including surface portions disposed about said opening, some of said surface portions facing each other in directions at right angles to the facing directions of others of said surface portions each of said surfaces having an inclination relative to the vertical axis of said spherical cornea-mounting element, mounting means for said first-named means, and means for securing said first-named means in fixed position relative to said cornea-mounting element and to said mounting means.

9. A clamp according to claim 8, wherein said means for securing said first-named means in fixed position comprises means on said first-named means and further comprises means on said mounting means, said means on said first-named means being in cooperative relationship with said means on said mounting means.

10. A clamp for maintaining eye cornea in condition suitable for keratoplasty, comprising, in combination, a substantially spherically curved cornea-mounting element for receiving cornea free from surface irregularities and distortions, means applying pressure on a cornea mounted on said element and on said element comprising means having an opening adapted to receive said cornea-mounting element, said last-named means comprising oppositely disposed parts bordering said opening and adapted to exert pressure on said cornea and on said cornea-mounting element for maintaining the cornea smoothly distributed over the said mounting element, said oppositely disposed parts comprising parts facing each other across said opening and further parts facing each other in directions at right angles to the facing directions of said first-named parts, mounting means for said first-named means, oppositely disposed means on said first-named means, and means on said mounting means cooperating with said oppositely disposed means for securing said first-named means in fixed relationship with said cornea-mounting element and with said mounting means.

References Cited in the file of this patent

UNITED STATES PATENTS

| | | |
|---|---|---|
| 1,358,328 | Reznor | Nov. 9, 1920 |
| 1,758,192 | Grubman | May 13, 1930 |
| 2,192,699 | Storz | Mar. 5, 1940 |
| 2,480,737 | Jayle | Aug. 30, 1949 |
| 2,598,060 | Kadesky | May 27, 1952 |
| 2,714,721 | Stone | Aug. 9, 1955 |
| 2,929,603 | Stewart | Mar. 22, 1960 |

FOREIGN PATENTS

| | | |
|---|---|---|
| 1,125,621 | France | July 16, 1956 |